US009213582B2

(12) United States Patent (10) Patent No.: US 9,213,582 B2
Narendra et al. (45) Date of Patent: Dec. 15, 2015

(54) DIFFERENTIATED SERVICE IDENTIFICATION IN A NETWORKED COMPUTING ENVIRONMENT

(75) Inventors: Nanjangud C. Narendra, Bangalore (IN); Karthikeyan Ponnalagu, Nadu (IN); Gandhi Sivakumar, Victoria (AU)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 13/456,519

(22) Filed: Apr. 26, 2012

(65) Prior Publication Data

US 2013/0290500 A1 Oct. 31, 2013

(51) Int. Cl.
*G06F 15/16* (2006.01)
*G06F 9/50* (2006.01)
*H04L 12/24* (2006.01)

(52) U.S. Cl.
CPC .......... *G06F 9/5072* (2013.01); *H04L 12/2402* (2013.01)

(58) Field of Classification Search
CPC .......................... G06F 9/5072; H04L 12/2402
See application file for complete search history.

(56) References Cited

U.S. PATENT DOCUMENTS

| 5,748,896 | A  | * | 5/1998  | Daly et al. ................... 709/223 |
| 8,239,499 | B2 | * | 8/2012  | Kwon ........................... 709/220 |
| 8,250,189 | B1 | * | 8/2012  | Breau et al. ................... 709/222 |
| 2008/0126147 | A1 |  | 5/2008 | Ang et al. |
| 2009/0006147 | A1 | * | 1/2009 | Padmanabhan ................... 705/7 |
| 2010/0071028 | A1 |  | 3/2010 | Brown et al. |
| 2010/0153914 | A1 |  | 6/2010 | Arsanjani et al. |
| 2010/0305986 | A1 |  | 12/2010 | Ponnalagu et al. |
| 2011/0040552 | A1 | * | 2/2011 | Van Guilder et al. ............. 704/4 |
| 2011/0191745 | A1 |  | 8/2011 | Allam et al. |
| 2011/0191748 | A1 |  | 8/2011 | Kannan et al. |
| 2011/0291953 | A1 | * | 12/2011 | Cheok et al. ................... 345/173 |

OTHER PUBLICATIONS

Maitland, J., "Keeping Control Isn't Easy", Chapter 4: Cloud-Based Infrastructure, SearchCloudComputing.com, 13 pages.
Mell et al., "The NIST Definition of Cloud Computing", National Institute of Standards and Technology, Information Technology Laboratory, Version 15, Oct. 7, 2009, 2 pages.

(Continued)

*Primary Examiner* — Lance Leonard Barry
*Assistant Examiner* — Keyvan Emdadi
(74) *Attorney, Agent, or Firm* — Maeve L. McCarthy; Hunter E. Webb; Keohane & D'Alessandro PLLC

(57) ABSTRACT

Embodiments of the present invention provide an approach for differentiated service identification/exposure in a networked computing environment (e.g., a cloud computing environment). In a typical embodiment, input model criteria will be generated. Such criteria may (among other things): identify service categories based on contextual bindings and domain centric functions; identify inter-service dependencies for a given business model (BPM); and/or provide dynamic validation of services to be exposed/identified. Embodiments of the present invention may further analyze service exposure criteria to provide efficient and accurate service exposure decisions as well as validation of the service exposure. This approach allows for consistent service exposure determinations based on decision histories of similarly (2-dimensional) aligned services in the past. This approach further allows for a validation assessment that is based on actual metrics of service usage verses an estimated usage at the time of service implementation.

20 Claims, 9 Drawing Sheets

(56) References Cited

OTHER PUBLICATIONS

Arsanjani, A., "A Methodology for Service Modeling and Design", Service Oriented Modeling and Architecture, IBM developer Works, Nov. 2004, 26 pages.

Ma et al., "Evaluating Service Identification with Design Metrics on Business Process Decomposition", IEEE International Conference on Services Computing, Sep. 2009, 8 pages.

Zhang et al., "Pattern Recognition based Adaptive Categorization Technique and Solution for Services Selection", Proceedings of the 2nd IEEE Asia-Pacific Service Computing Conference, 2007, 9 pages.

Maitland, J., "Keeping Control Isn't Easy", Chapter 4: Cloud-Based Infrastructure, SearchCloudComputing.com, Publication Date: Oct. 2009, 17 pages.

* cited by examiner

| CANDIDATE | LITMUS TEST 1: >1 PROVIDER APPLICATION? | LITMUS TEST 2: >1 CONSUMER? | LITMUS TEST 3: PROVIDER(S) TO BE REPLACED/RE-ENGINEERED OR NEW PROVIDERS <24 MONTHS? | LITMUS TEST 4: >1 CONSUMER LIKELY REQUIRED FOR DELIVERY <24 MONTHS? | LITMUS TEST 5: COMPLEX PROVIDER APPLICATION INTER-ACTION? | IS THIS A QUALIFIED SERVICE? |
|---|---|---|---|---|---|---|
| ADDRESS MANAGEMENT | APPLICABLE | APPLICABLE | APPLICABLE | APPLICABLE | APPLICABLE | YES/NO |
| CUSTOMER ACCOUNT MANAGEMENT | APPLICABLE | APPLICABLE | APPLICABLE | APPLICABLE | APPLICABLE | YES/NO |
| CONTACT MANAGEMENT | APPLICABLE | APPLICABLE | APPLICABLE | APPLICABLE | APPLICABLE | YES/NO |
| PRODUCTION MANAGEMENT | APPLICABLE | APPLICABLE | APPLICABLE | APPLICABLE | APPLICABLE | YES/NO |
| CUSTOMER MANAGEMENT | APPLICABLE | APPLICABLE | APPLICABLE | APPLICABLE | APPLICABLE | YES/NO |
| PRODUCT ORDER MANAGEMENT | APPLICABLE | APPLICABLE | APPLICABLE | APPLICABLE | APPLICABLE | YES/NO |

FIG. 7

DIFFERENTIATED SERVICE IDENTIFICATION IN A NETWORKED COMPUTING ENVIRONMENT

TECHNICAL FIELD

In general, embodiments of the present invention relate to differentiated service identification/exposure. Specifically, embodiments of the present invention relate to differentiated service (e.g., cloud services) identification in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Traditional service-oriented architecture (SOA)-based solutions typically lack a capability to dynamically qualify an entity as a service. A service is generally "layer sensitive." A layer refers to the stratum in a logical stack where a service may be hosted. A service that is hosted in a lower stratum may be less granular and may directly interact with provider applications. Conversely, a service that is hosted in an upper stratum may be very coarse and may directly not interact with provider applications, but rather leverage lower granular services for fulfilling a request. Thus, each stratum is different, and the service residing in every layer needs to be subjected to a service litmus test (SLT) for complete modeling. Challenges currently exist in that existing SLTs typically include a series of manually implemented and disconnected questions that rely on guesswork and human interpretation. As such, existing approaches may fail to provide a consistent and/or accurate analysis.

SUMMARY

In general, embodiments of the present invention provide an approach for differentiated service identification/exposure in a networked computing environment (e.g., a cloud computing environment). In a typical embodiment, input model criteria will be generated. Such criteria may (among other things): identify service categories based on contextual bindings and domain centric functions; identify inter-service dependencies for a given business process model (BPM); and/or provide dynamic validation of services to be exposed/identified. Embodiments of the present invention may further analyze service exposure criteria to provide efficient and accurate service exposure decisions as well as validation of the service exposure. This approach allows for consistent service exposure determinations based on decision histories of similarly (2-dimensional) aligned services in the past. This approach further allows for a validation assessment that is based on actual metrics of service usage verses an estimated usage at the time of service implementation.

A first aspect of the present invention provides a computer-implemented method for differentiated service identification in a networked computing environment, comprising: identifying an architecture type for each of a set of candidate services; identifying a service type for each of the set of candidate services; determining a set of categories for the set of candidate services; categorizing each of the set of candidate services in the set of categories based on the service type; defining a set of exposure criteria for the set of categories; analyzing the set of exposure criteria based on a set of re-defined rules; and applying the set of exposure criteria to the set of candidate services.

A second aspect of the present invention provides a system for differentiated service identification in a networked computing environment, comprising: a memory medium comprising instructions; a bus coupled to the memory medium; and a processor coupled to the bus that when executing the instructions causes the system to: identify an architecture type for each of a set of candidate services; identify a service type for each of the set of candidate services; determine a set of categories for the set of candidate services; categorize each of the set of candidate services in the set of categories based on the service type; define a set of exposure criteria for the set of categories; analyze the set of exposure criteria based on a set of re-defined rules; and apply the set of exposure criteria to the set of candidate services.

A third aspect of the present invention provides a computer program product for differentiated service identification in a networked computing environment, the computer program product comprising a computer readable storage media, and program instructions stored on the computer readable storage media, to: identify an architecture type for each of a set of candidate services; identify a service type for each of the set of candidate services; determine a set of categories for the set of candidate services; categorize each of the set of candidate services in the set of categories based on the service type; define a set of exposure criteria for the set of categories; analyze the set of exposure criteria based on a set of re-defined rules; and apply the set of exposure criteria to the set of candidate services.

A fourth aspect of the present invention provides a method for deploying a system for differentiated service identification in a networked computing environment, comprising: providing a computer infrastructure being operable to: identify an architecture type for each of a set of candidate services; identify a service type for each of the set of candidate services; determine a set of categories for the set of candidate services; categorize each of the set of candidate services in the set of categories based on the service type; define a set of exposure criteria for the set of categories; analyze the set of exposure criteria based on a set of re-defined rules; and apply the set of exposure criteria to the set of candidate services.

BRIEF DESCRIPTION OF THE DRAWINGS

These and other features of this invention will be more readily understood from the following detailed description of the various aspects of the invention taken in conjunction with the accompanying drawings in which:

FIG. 7 depicts a table showing application of a static SLT according to an embodiment of the present invention.

FIG. 8 depicts a table showing application of a dynamic SLT according to an embodiment of the present invention.

Figure 1:
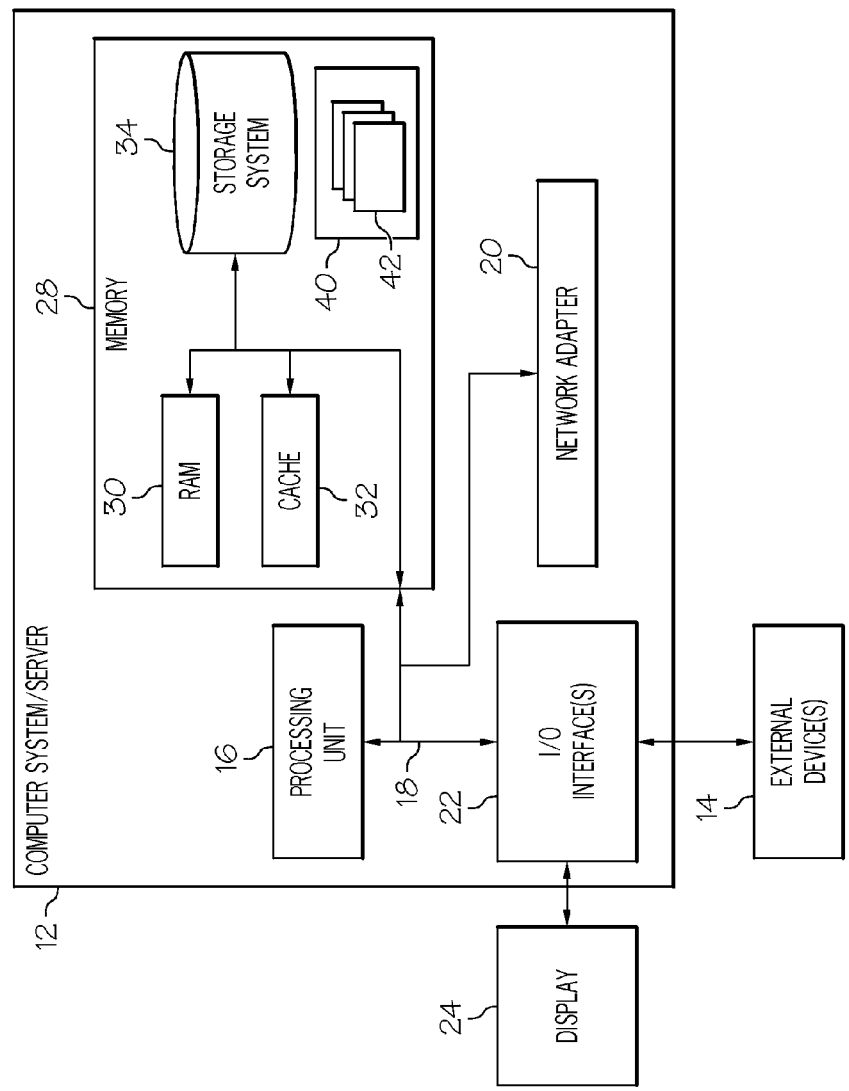
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention provide an approach for differentiated service identification/exposure in a networked computing environment (e.g., a cloud computing environment). In a typical embodiment, input model criteria will be generated. Such criteria may (among other things): identify service categories based on contextual bindings and domain centric functions; identify inter-service dependencies for a given business model (BPM); and/or provide dynamic validation of services to be exposed/identified. Embodiments of the present invention may further analyze service exposure criteria to provide efficient and accurate service exposure decisions as well as validation of the service exposure. This approach allows for consistent service exposure determinations based on decision histories of similarly (2-dimensional) aligned services in the past. This approach further allows for a validation assessment that is based on actual metrics of service usage verses an estimated usage at the time of service implementation.

In more specific terms, embodiments of the present invention allow for qualifying an entity as a service through a reusable, dynamic service litmus test (SLT). Moreover, embodiments of the present invention provide a graphical user interface (GUI)-based apparatus to assign service layers and SLT parameters to the SLT, and to assign candidate services to the SLT. Such a configuration (among other things), enables service layer sensitivity to the SLT parameters.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
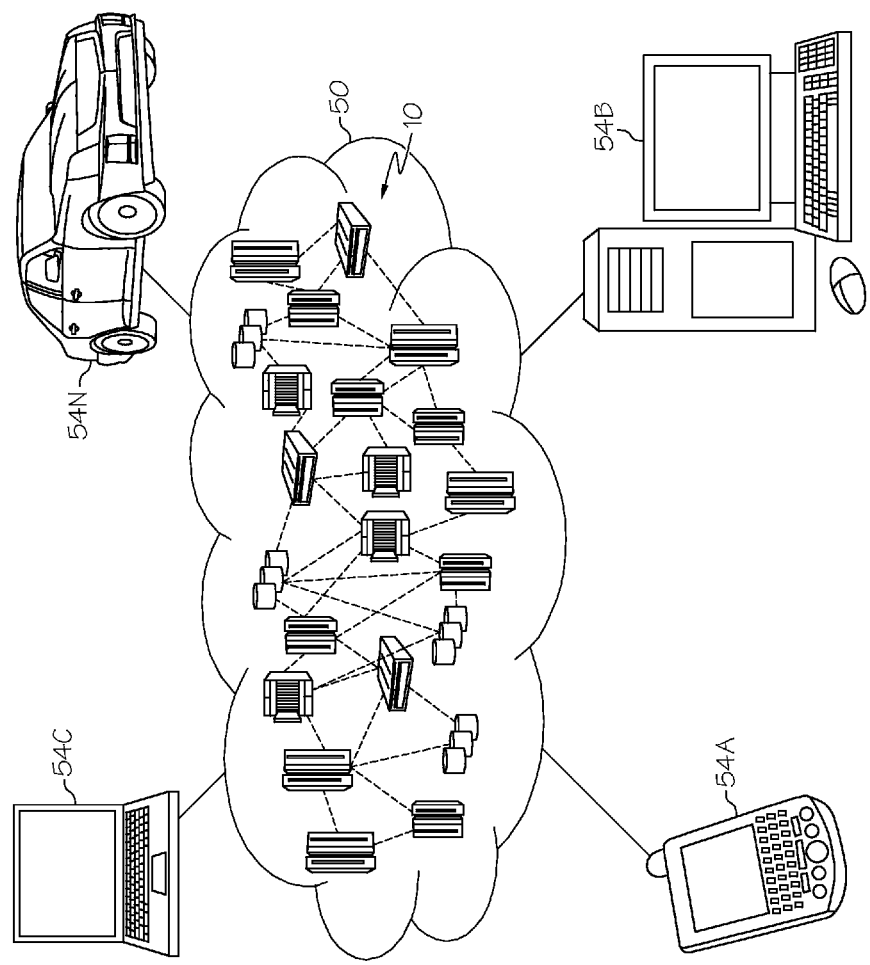
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
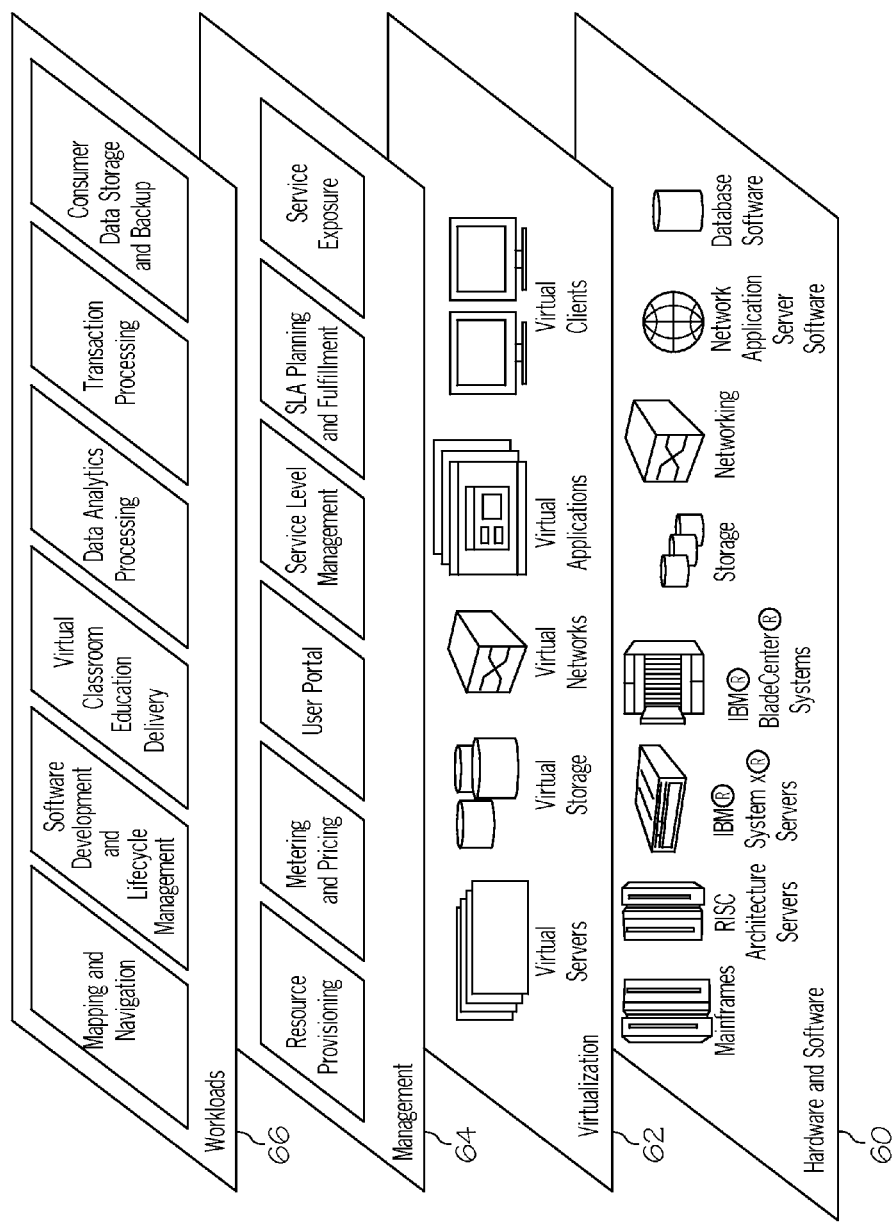
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is service exposure, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the exposure functionality of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

In general, program 40 (FIG. 1) and/or service exposure function of FIG. 3 enable the teachings of the embodiments of the present invention herein. For example, program 40 and/or service exposure function may: identify an architecture type (e.g., a business model, a business process model, a logical data model, existing assets, a goal model etc.) for each of a set of candidate services (e.g., cloud services of a cloud computing environment); identify a service type for each of the set of candidate services; determine a set of categories for the set of candidate services; categorize each of the set of candidate services in the set of categories based on the service type; define a set of exposure criteria for the set of categories; analyze the set of exposure criteria based on a set of re-defined rules; apply the set of exposure criteria to the set of candidate services; validate the set of candidate services based on the applying; determine a layer of an architectural stack for hosting each of the set of candidate services; determine dependencies between each of the set of candidate services; and/or utilize historical data (e.g., stored in one or more computer storage devices) to identify a set of past services similar to the set of candidate services.

Figure 4:
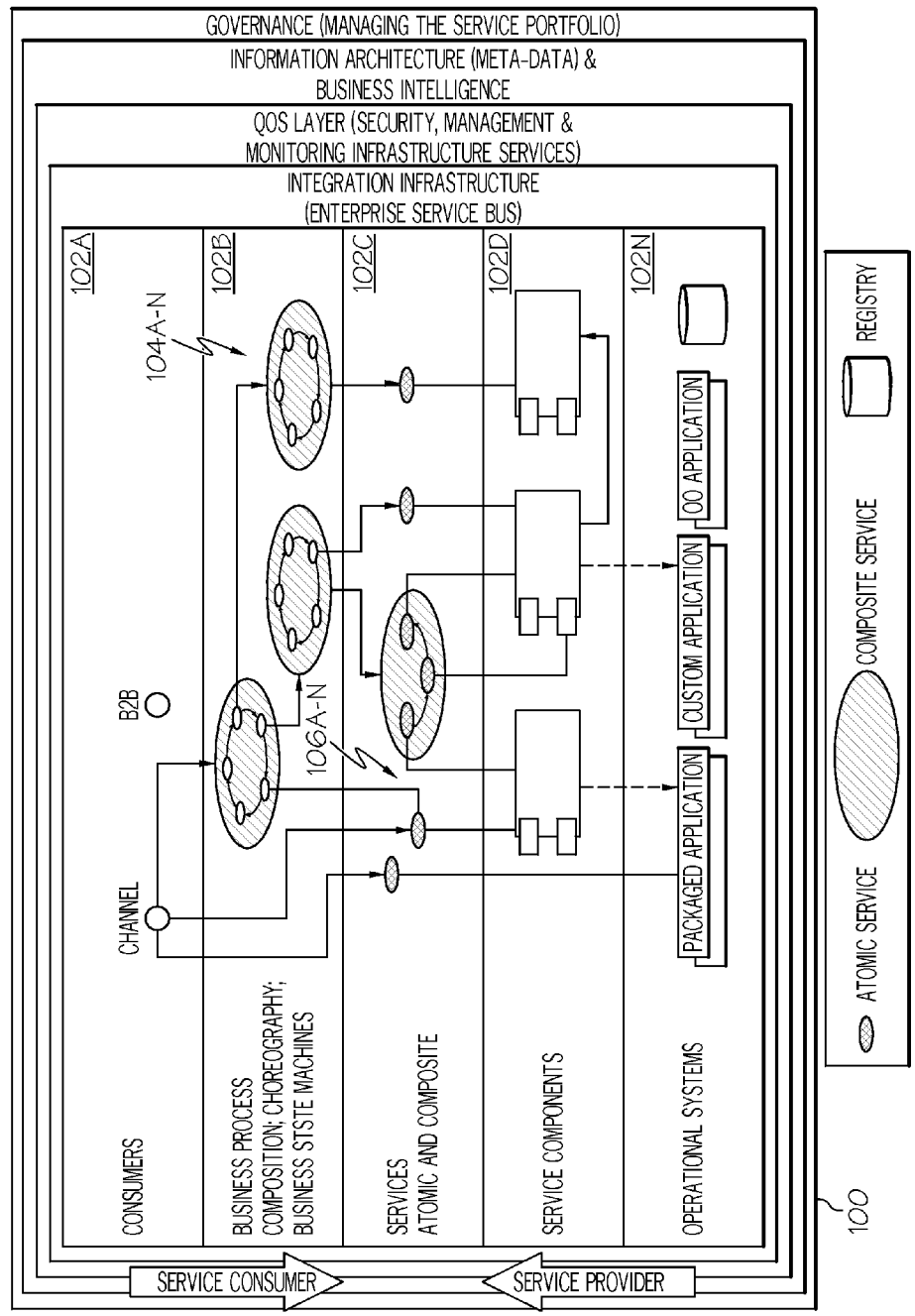
FIG. 4 depicts an architectural stack diagram according to an embodiment of the present invention.

In any event, referring to FIG. 4, an illustrative architectural stack 100 (e.g., a service-oriented architecture (SOA) stack) is shown. As depicted, stack 100 comprises layers 102A-N. Such layers 102A-N may comprise a consumer layer 102A, a business process composition layer 102B, a services layer 102C, a service component layer 102D, and an operational system layer 102N. As further shown, business process composition layer 102B may comprise composite services 104A-N, while service layer 102C may comprise atomic services 106A-N. Among other things, embodiments of the present invention may generate and apply a reusable SLT to: identify and/or qualify entities as services; and/or determine what layer 102A-N of stack 100 in which a particular service may be placed.

Figure 5:
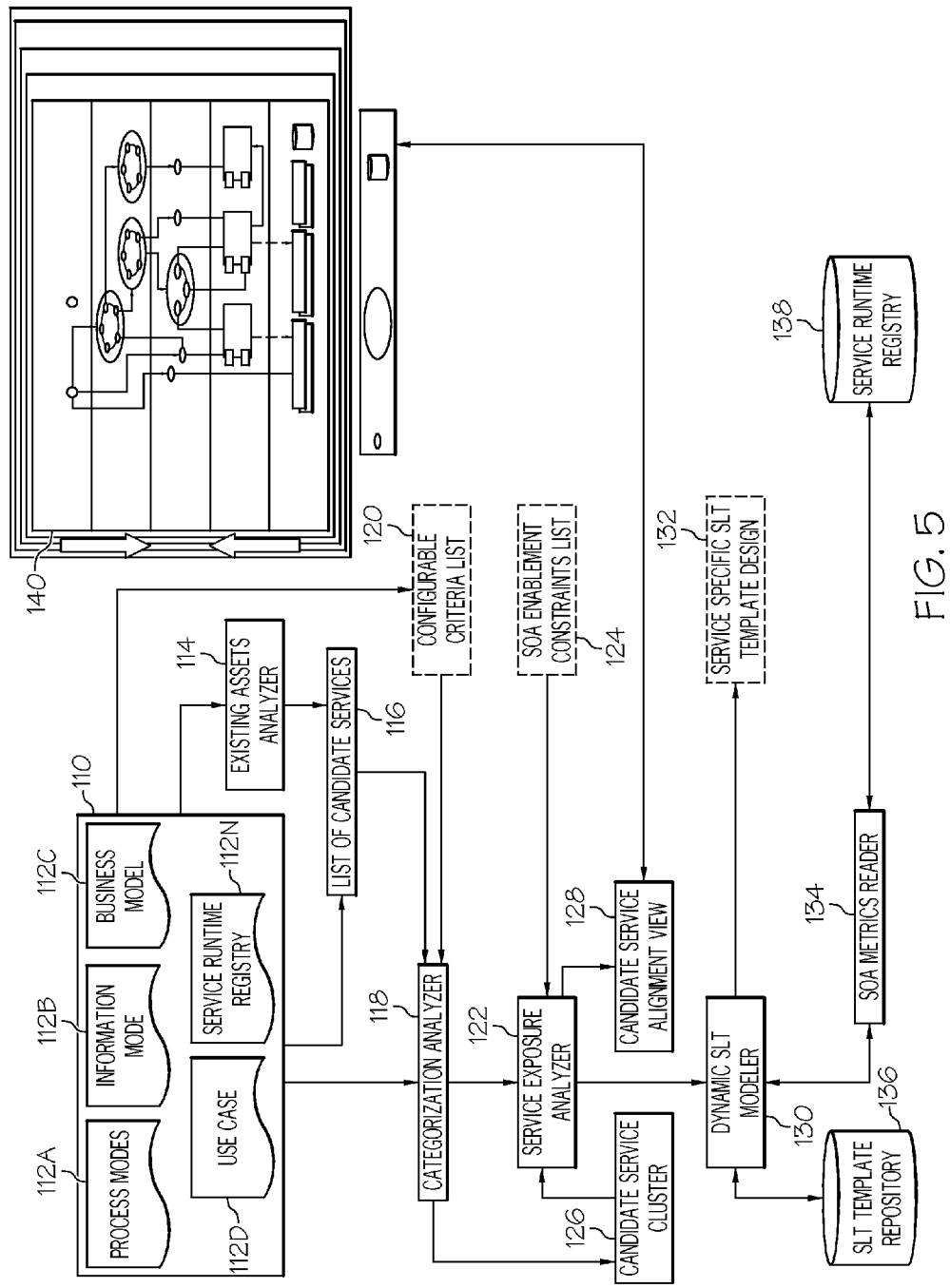
FIG. 5 depicts a process flow diagram according to an embodiment of the present invention.

Referring now to FIG. 5, a system flow diagram according to an embodiment of the present invention is shown. As depicted, for each candidate service (e.g., in a list of candidate services 116), a business architecture type 110 is identified via existing assets analyzer 114. Illustrative business architecture type 110 may comprise process models 112A, information models 112B, business models 112C, use cases 112D, and/or service runtime registries 112N. Thereafter, existing assets analyzer 114 may identify a service type for each candidate service in list 116 and obtain source dependencies therefor. Further, based on the architectural type 110, a configurable criteria list 120 for a reusable SLT will be defined. Configurable criteria list 120 will be fed as input along with list of candidate services 116 to categorization analyzer 118 that will determine categories for the candidate services on list 116 and then categorize service candidates with similar inputs. Service exposure analyzer 122 will then define exposure criteria for the generated categories for future reference and reuse, and analyze the exposure criteria based on predefined rules (e.g., for each criteria). This may involve data pertaining to the clustering of candidate services (e.g., by candidate service cluster component 126 (e.g., based upon characteristics of the candidate services such as underlying functions, runtime characteristics, etc.), and or input from a SOA enablement constraints list 124 (e.g., comprising any enablement constraints that may affect the analysis).

Regardless, the analysis of the exposure criteria may comprise: validation of the exposure criteria based upon historical data for past service exposure decisions of similar categorized services; and/or validation of selected service exposure decisions based on actual models/operations of similar services. As further shown, one or more views such as view 140 of architectural stack and/or representing candidate services (e.g., for each criteria) may be generated via candidate service alignment view component 128. Based on the analysis, dynamic SLT modeler 130 will generate a service specific SLT template design 132 (e.g., having the exposure criteria). This can be performed using previous templates from a SLT template repository 136 or the like. In any event, dynamic SLT modeler can then apply the SLT to the candidate services, which SOA metrics reader 134 reads metrics resulting therefrom. Such metrics may be fed back to dynamic SLT modeler 130 and/or saved in service runtime registry Illustrative Examples The following section discusses various diagrams pertaining to illustrative examples according to the embodiments of the present invention. It is understood that the teachings recited herein are not limited to the specific examples and/or data depicted within the figures.

Figure 6:
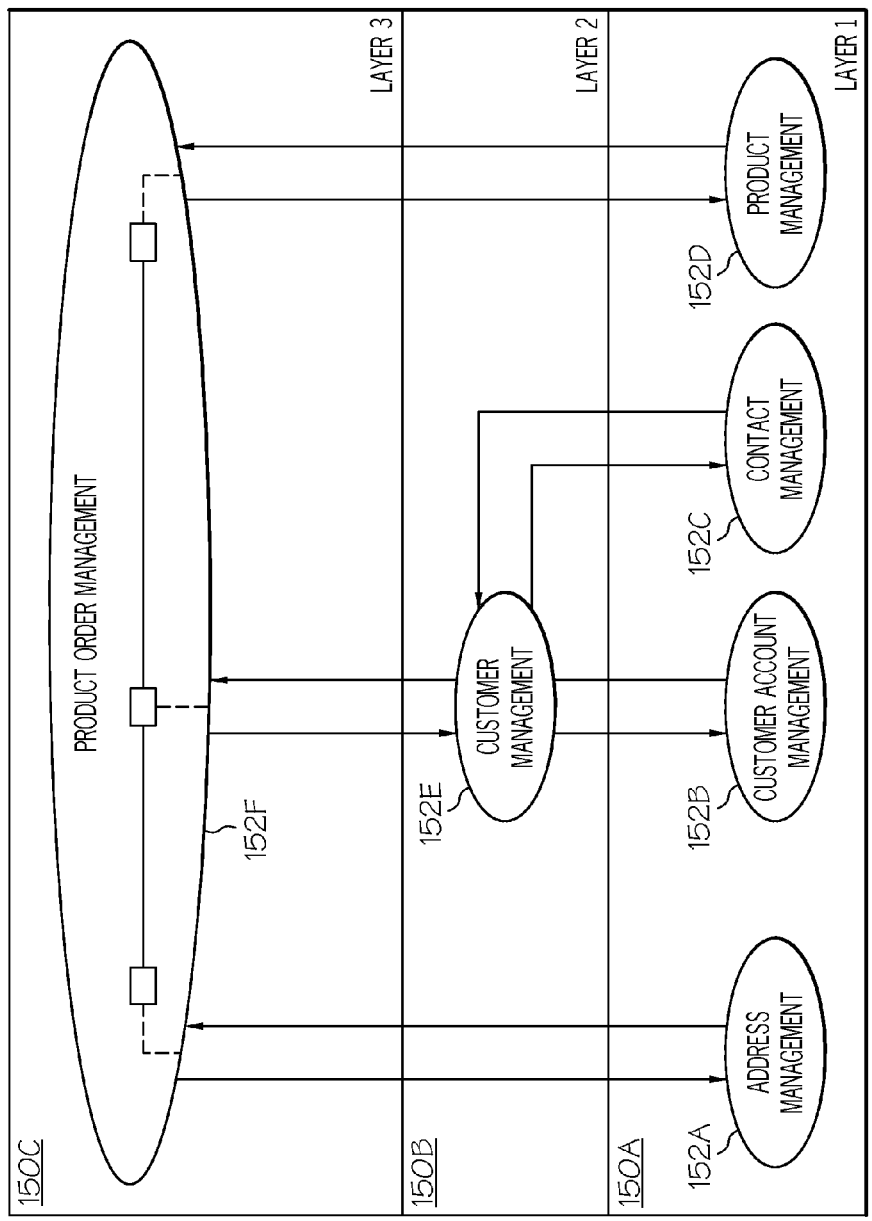
FIG. 6 depicts an illustrative service diagram according to an embodiment of the present invention.

Referring to FIG. 6, a business process service is shown. As depicted, layers 150A-C are shown. In layer 150A, various management services are provided. For example, layer 150A comprises address management service 152A, customer account management service 152B, contact management service 152C, and product management service 152D. In layer 152E, customer management service resides, while in layer 150C, product order management service 152F resides. In general, product order management service 152F is exposed to external consumers and depends upon address management service 152A, customer management service 152E, and product management service 152D. Further, in this example product order management service 152F does not directly interact with provider applications. Moreover, customer management service 152E may be consumed by product order management service 152F (and may or may not be exposed to external consumers), and depends on customer account management service 152B and contact management service 152C for fulfilling a business need. Still yet, address management service 152A and product management service 152D may be consumed by product order management service 152F. Similarly, customer account management service 152B and contact management service 152C may be consumed by customer management service 152E and may or may not be exposed to external consumers.

As can be seen from FIG. 6, the services themselves may be different. As such, applying a static litmus test (e.g., when such services are candidates) would result in incorrect results. An example of an application of a static litmus test is shown in FIG. 7. Specifically, table 200 depicts services 202A-N and litmus tests 204A-N applied thereto. Under a static application such as that shown, all tests 204A-N are applied to all services 202A-N (even though some tests may not apply to certain services). For example, the tests circled would not generally apply to the corresponding services. However, because the test was static, the tests circles would be erroneously indicated as being "applicable" to the corresponding services and applied thereto nonetheless. Such an implementation will yield inaccurate results.

Under a SOA, various contextual properties may be established. In general, such contextual properties may include one or more of the following:

Environmental Context

Technology/Tool/Deployment/Service Provider/Discoverability

Communication Context

Interaction/Message Exchange/Coupling/Orchestration

Architectural Context

Domain/Functions/Complexity/Layer/Metadata/Granularity

Operational Context

Runtime/Availability/Consumability/Scalability/Contract/Management/SLA

Design Context

Extensibility/Autonomic/Compatibility

Figure 8:
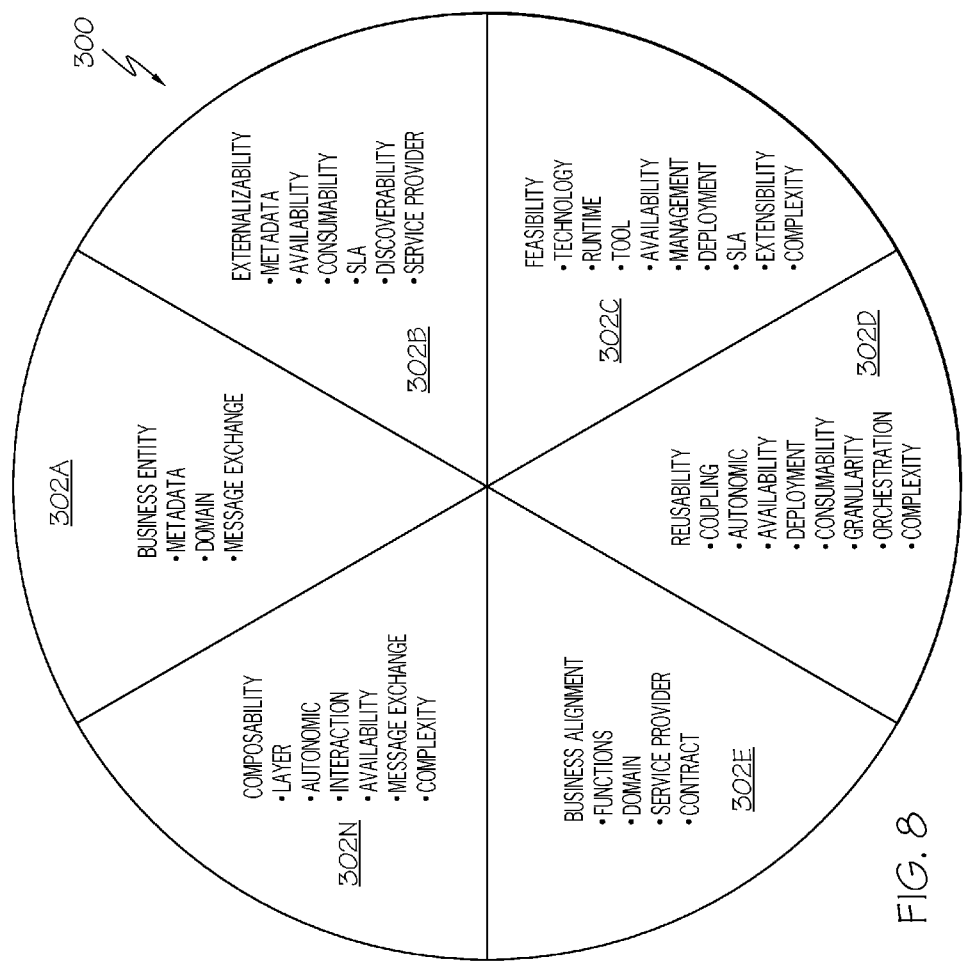
FIG. 8 depicts a mapping of contextual properties to SLT criteria according to an embodiment of the present invention.

Under an embodiment of the present invention, contextual properties may be mapped to SLT criteria. Referring now to FIG. 8, an illustrative mapping 300 is shown. As depicted, mapping 300 comprises contextual properties mapped to various SLT criteria 302A-N. Under embodiments of the present invention such a mapping may be automatically generated based upon historical data and/or configured by a user. Further, mapping may be graphically depicted for easier modification.

Figure 9:
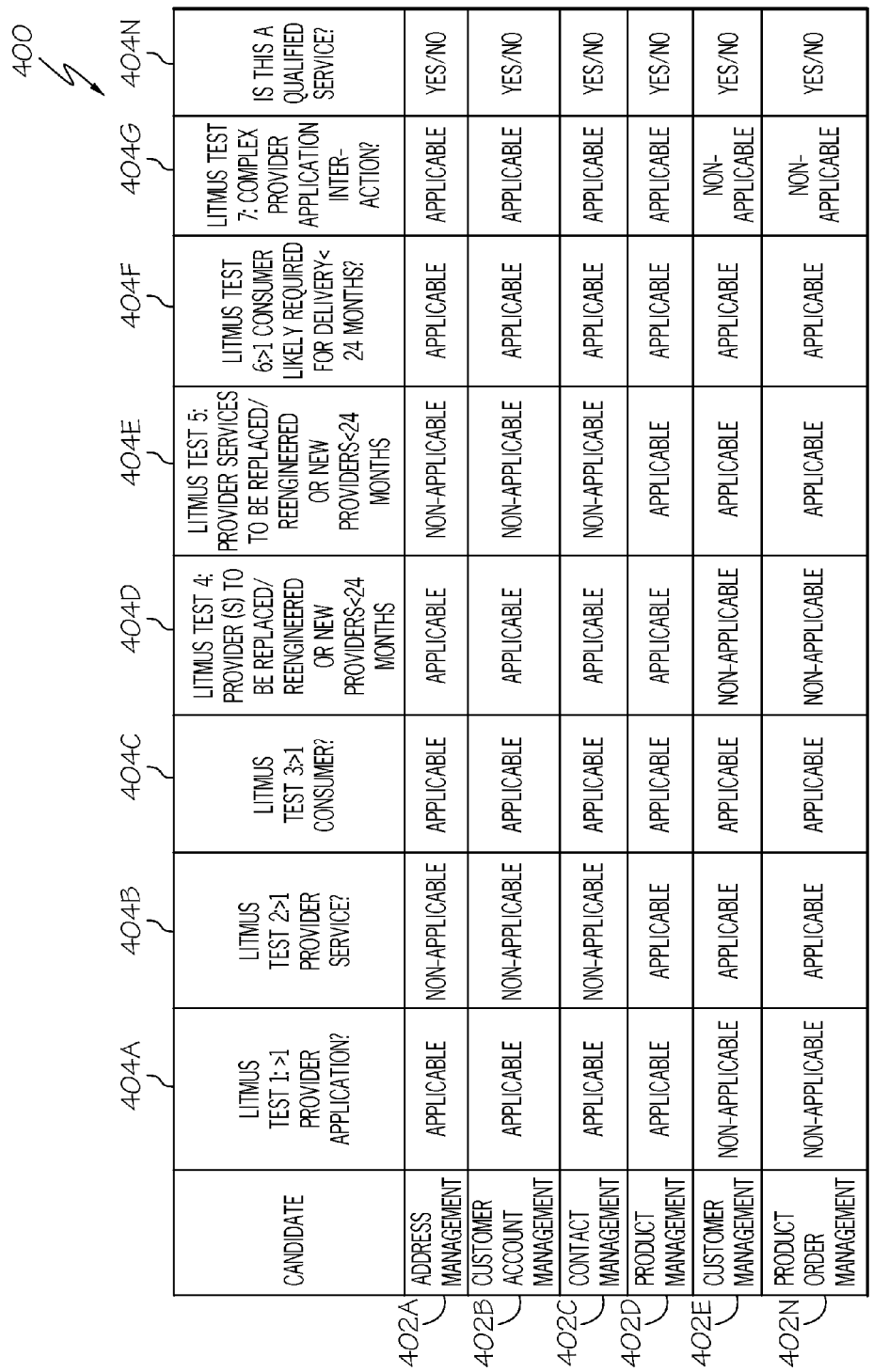

As indicated above, embodiments of the present invention may utilize various types of historical data to generate, improve, and/or apply a SLT. As such, one or more decision history databases (e.g., computer storage devices) may be provided hereunder. In general, such a database(s) may have the following design:

A list of tables: Service, Service Decision, Criteria Master, Service Metrics, Context Master Service data: Contains the Service Unique Identifier, set of applied/applicable Context data (referring Context Master), other service characterizing data Service decision data: ServiceDecisionID, corresponding Service ID (referring Service) set of applied Criteria (referring Criteria Master), set of Matched Service Ids (referring Service), Arrived Decision (based on the Method), overriding Decision (based on Manual judgment), Final Decision Criteria master data: Criteria ID, Criteria Name, Criteria Group, Service metric data: Metric Id, Associated Service Id, list of Service Metrics Context master data: Context Id, Context Name, Context Group Such data may be utilized to generate a dynamic SLT that enables a differentiated treatment of parameters apportioned in line with the layer of the architectural stack in which the service resides. Shown in FIG. 9 is a table 400 depicting services 402A-N and litmus tests 404A-N. As shown in the table, certain litmus tests were indicated as not being applicable to certain services. For example, litmus test 404A is not applicable to services 402A and 402N. As such, the corresponding cells in table 400 indicate as much. As a result, those litmus tests would not be applied to inapplicable services, thus reducing system errors and improving overall accuracy and/or efficiency.

While shown and described herein as a differentiated service identification/exposure solution, it is understood that the invention further provides various alternative embodiments. For example, in one embodiment, the invention provides a computer-readable/useable medium that includes computer program code to enable a computer infrastructure to provide differentiated service identification/exposure functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide differentiated service identification/exposure functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for differentiated service identification/exposure. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for differentiated service identification in a networked computing environment, comprising:

identifying an architecture type with which to classify each of a set of candidate services, each of the set of candidate services being a cloud service of a cloud computing environment that requires qualification as a service;

identifying a service type with which to classify each of the set of candidate services;

determining a set of categories with which to categorize the set of candidate services;

categorizing each of the set of candidate services in the set of categories based on the service type using a configurable criteria list formed from inputs of previously categorized services;

defining a set of exposure criteria with which to classify the set of categories;

analyzing the set of exposure criteria based on a set of re-defined rules and at least one of: historical data for service exposure decisions for previously categorized services or operational data of the previously categorized services;

generating a dynamic service litmus test (SLT) that is specific to the service based on the analysis of the exposure criteria; and applying the dynamic SLT to the set of candidate services.

2. The computer-implemented method of claim 1, further comprising validating the set of candidate services based on the applying.

3. The computer-implemented method of claim 2, further comprising determining a layer of an architectural stack for hosting each of the set of candidate services, and generating a view of the architectural stack that represents the candidate services for each of the exposure criteria.

4. The computer-implemented method of claim 1, the architectural type comprising a model selected from a group consisting of: a business model, a business process model, a logical data model, and a goal model.

5. The computer-implemented method of claim 1, further comprising determining dependencies between each of the set of candidate services.

6. The computer-implemented method of claim 1, the categorizing being further based on the architecture type.

7. The computer-implemented method of claim 1, the analyzing comprising unitizing historical data to identify a set of past services similar to the set of candidate services.

8. The computer-implemented method of claim 1, the networked computing environment comprising a cloud computing environment.

9. A system for differentiated service identification in a networked computing environment, comprising:

a memory medium comprising instructions;

a bus coupled to the memory medium; and a processor coupled to the bus that when executing the instructions causes the system to:

identify an architecture type with which to classify each of a set of candidate services, each of the set of candidate services being a cloud service of a cloud computing environment that requires qualification as a service;

identify a service type with which to classify each of the set of candidate services;

determine a set of categories with which to categorize the set of candidate services;

categorize each of the set of candidate services in the set of categories based on the service type using a configurable criteria list formed from inputs of previously categorized services;

define a set of exposure criteria with which to classify the set of categories;

analyze the set of exposure criteria based on a set of re-defined rules and at least one of: historical data for service exposure decisions for previously categorized services or operational data of the previously categorized services;

generate a dynamic service litmus test (SLT) that is specific to the service based on the analysis of the exposure criteria; and apply the dynamic SLT to the set of candidate services.

10. The system of claim 9, the memory medium further comprising instructions for causing the system to:

validate the set of candidate services based on the applying;

determine a layer of an architectural stack for hosting each of the set of candidate services; and generate a view of the architectural stack that represents the candidate services for each of the exposure criteria.

11. The system of claim 9, the architectural type comprising a model selected from a group consisting of: a business model, a business process model, a logical data model, and a goal model.

12. The system of claim 9, the memory medium further comprising instructions for causing the system to determine dependencies between each of the set of candidate services.

13. The system of claim 9, the memory medium further comprising instructions for causing the system to utilize historical data to identify a set of past services similar to the set of candidate services.

14. The system of claim 9, the networked computing environment comprising a cloud computing environment.

15. A computer program product for differentiated service identification in a networked computing environment, the computer program product comprising a computer readable storage device, and program instructions stored on the computer readable storage device, to:

identify an architecture type with which to classify each of a set of candidate services, each of the set of candidate services being a cloud service of a cloud computing environment that requires qualification as a service;

identify a service type with which to classify each of the set of candidate services;

determine a set of categories with which to classify the set of candidate services;

categorize each of the set of candidate services in the set of categories based on the service type using a configurable criteria list formed from inputs of previously categorized services;

define a set of exposure criteria with which to classify the set of categories;

analyze the set of exposure criteria based on a set of re-defined rules and at least one of:

historical data for service exposure decisions for previously categorized services or operational data of the previously categorized services;

generate a dynamic service litmus test (SLT) that is specific to the service based on the analysis of the exposure criteria; and apply the dynamic SLT to the set of candidate services.

16. The computer program product of claim 15, the computer readable storage device further comprising instructions to:

validate the set of candidate services based on the applying;

determine a layer of an architectural stack for hosting each of the set of candidate services; and generate a view of the architectural stack that represents the candidate services for each of the exposure criteria.

17. The computer program product of claim 15, the architectural type comprising a model selected from a group consisting of: a business model, a business process model, a logical data model, and a goal model.

18. The computer program product of claim 15, the computer readable storage device further comprising instructions to determine dependencies between each of the set of candidate services.

19. The computer program product of claim 15, the computer readable storage device further comprising instructions to utilize historical data to identify a set of past services similar to the set of candidate services.

20. A method for deploying a system for differentiated service identification in a networked computing environment, comprising:
　providing a computer infrastructure being operable to:
　　identify an architecture type with which to classify each of a set of candidate services, each of the set of candidate services being a cloud service of a cloud computing environment that requires qualification as a service;
　　identify a service type with which to classify each of the set of candidate services;
　　determine a set of categories with which to classify the set of candidate services;
　　categorize each of the set of candidate services in the set of categories based on the service type using a configurable criteria list formed from inputs of previously categorized services;
　　define a set of exposure criteria with which to classify the set of categories;
　　analyze the set of exposure criteria based on a set of re-defined rules and at least one of: historical data for service exposure decisions for previously categorized services or operational data of the previously categorized services;
　　generate a dynamic service litmus test (SLT) that is specific to the service based on the analysis of the exposure criteria; and
　　apply the dynamic SLT to the set of candidate services.

* * * * *